Patented June 17, 1952

2,600,450

UNITED STATES PATENT OFFICE 2,600,450

COPOLYMERS OF ACRYLIC AND VINYL ESTERS

William L. Van Horne, Philadelphia, Harry T. Neher, Bristol, and La Verne N. Bauer, Philadelphia, Pa., assignors to Rohm & Haas Company, Philadelphia, Pa., a corporation of Delaware No Drawing. Application May 12, 1950, Serial No. 161,725

6 Claims. (Cl. 260—86.1)

This invention relates to copolymers of (A) esters of acrylic acid and saturated aliphatic monohydric alcohols of 16 to 18 carbon atoms and (B) vinyl esters of saturated aliphatic monocarboxylic acids of 6 to 12 carbon atoms, the proportion of the acrylic ester groups (A) to the vinyl ester groups (B) being from 1:2 moles up to 1:3n—10, where n is the number of carbon atoms in the longest carbon chain of the vinyl ester.

This invention also concerns compositions of matter comprising wax-containing hydrocarbon liquids having dissolved therein at least one of the above-described copolymers in an amount sufficient to depress the pour point of the said liquids.

Proposals have been made to form polymers or interpolymers of various unsaturated esters. Copolymerization of the particular esters above defined in the proportions here defined has not, however, been previously suggested. The properties peculiar to the copolymers of this invention are not identical with those of previously suggested polymeric products in this field.

While proposals have been made to dissolve many types of resinous materials in oils, in the case of but relatively few solutions of polymeric products does this result in a lowering of the pour point. In some cases the effect is merely to thicken the oil. In some cases the temperature-viscosity relationships may be improved. The pour point of the various solutions may be raised or may remain unaltered. Occasionally it has been found that the pour point is lowered. This result has not, however, been predictable.

We have observed that polymers of cetyl acrylate, stearyl acrylate, vinyl hexoate, vinyl octoate, or vinyl isononoate, and the like do not lower the pour point of oils or other hydrocarbon fluids having waxy pour points when such polymers are dissolved therein either singly or in mixtures. In contrast to this situation we have now discovered that copolymers of alkyl acrylates in which the alkyl group has a chain of 16 to 18 carbon atoms and vinyl esters of aliphatic carboxylic acids, R'COOH, wherein R' is an alkyl group having 5 to 11 carbon atoms are effective pour point depressants when the copolymers are formed from mixtures of the two defined types of esters in mole ratios from 1:2 to 1:X, where X=3n—10, n being the number of carbon atoms in the longest chain of the acid portion of the vinyl ester. Thus, when vinyl hexoate is used, the limits are 1:2 to 1:8, while with vinyl laurate the limits are 1:2 to 1:26.

There are thus used cetyl acrylate, or heptadecyl acrylate, or octadecyl acrylate on the one hand and on the other a vinyl ester such as vinyl hexoate, vinyl heptanoate, vinyl octoate, vinyl 2-ethylhexoate, vinyl 3,5,5-trimethylhexoate, vinyl decanoate, or vinyl laurate.

The vinyl ester, $CH_2=CHOOCR'$, is that of a saturated monocarboxylic in which R' is an alkyl group having a chain of at least five carbon atoms and not more than eleven carbon atoms. The group R' may be of straight or branched chain structure.

Preparation of esters of the above types is well known. Acrylic esters may be formed directly from acrylic acid and an alcohol of proper chain length. A lower acrylic ester may be transformed into a higher ester by alcoholysis. Vinyl esters of proper size may similarly be formed from lower esters by replacement of a small acid group by a larger. They may also be made by reaction of acetylene and acid in the presence of a zinc or cadmium salt, particularly a zinc or cadmium salt of the acid being reacted.

In the preparation of the copolymers of this invention it is necessary that conditions be chosen which ensure copolymerization and the formation of soluble copolymers. Copolymerization is usually best effected in a solvent, such as benzene, toluene, xylene, or a petroleum naphtha. It may also be effected in a mineral oil, such as a lubricating oil. A catalyst is added to the solution of the monomers. The amount of catalyst used may vary from about 2% to 12% or more of the weight of the monomers. It is generally desirable to start with a small amount of catalyst and add catalyst from time to time as copolymerization proceeds. Solvent may also be added from time to time. Even though copolymerization may be initiated without solvent, it is generally desirable to add solvent as copolymerization proceeds to ensure homogeneity of the copolymer or solution of the copolymer.

Temperatures of copolymerization from about 75° C. to 140° C. may be used. One temperature may be used at the start and others as copolymerization proceeds. Optimum temperatures depend upon solvent selected, concentration of monomers therein, catalyst selected, and time. Such factors should be fixed with reference to the intended molecular size of copolymer and with regard for maintaining the copolymer in an oil-soluble form. Adherence to conditions described will usually ensure such a soluble copolymer. If gelation should occur as through failure to observe proper conditions, it is best to discard the product. Under the conditions here described copolymers having apparent molecular weights from about 1000 to 50,000 may be prepared.

Suitable catalysts for effecting the desired copolymerization include organic peroxides and acylic azo compounds, such as azodiisobutyronitrile. Suitable peroxides include acetyl peroxide, caproyl peroxide, lauroyl peroxide, benzoyl peroxide, dibenzal peroxide, di-tert.-butyl diperphthalate, tert.-butyl perbenzoate, 2,2-bis-(tert.-butylperoxy)butane, methyl ethyl ketone peroxide, di-tert.-butyl peroxide, and tert.-butylhydroperoxide. A single peroxide or several peroxides may be added to the mixture of monomers or the copolymerizing mixture.

If desired, the coplymer may be transferred from the solvent solution to an oil. The solvent can be displaced by oil with the aid of heat and reduced pressure. In this way concentrates of copolymer in oil are made available. They are a convenient form for addition to waxy oils to provide the relatively small amounts which are needed for pour point depressing action.

In the following illustrative examples details of the preparation of typical copolymers of this invention are presented.

*Example 1*

A reaction vessel was flushed with nitrogen and heated to 120° C. by means of an oil bath. While the vessel was maintained at this temperature, there was charged to it with stirring over a period of 1.7 hours a mixture prepared from 250 parts of toluene, 28 parts of stearyl acrylate, 472 parts of vinyl laurate, and 12.5 parts of benzoyl peroxide. After 4.3 hours the temperature of the vessel was allowed to fall to 105° C., at which level it was maintained until a total of 7.5 hours had elapsed. Benzoyl peroxide was added as follows: at 2.8 hours, 5 parts; at 4.8 hours, 12.5 parts; at 5.8 hours, 5 parts; and at 6.8 hours, 2 parts. Additions of 87 parts each of toluene were made at 2.8 hours, 4.8 hours, 5.8 hours, and 6.8 hours. The product was a 37.8% solution of copolymer. The viscosity of a 30% solution of copolymer in toluene was 13 centistokes at 100° F.

There were mixed 36 parts of the 37.8% solution in toluene and 51 parts of a light mineral oil. The mixture was stirred and heated under reduced pressure to remove the solvent, heating being carried to 140° C./3 mm. There was thus provided a concentrate of 19.2% of copolymer in oil. This concentrate was found useful for addition to wax-containing oils to depress the normal pour point thereof.

*Example 2*

A mixture of 205 parts by weight of cetyl acrylate, 295 parts of vinyl hexoate, 25 parts of benzoyl peroxide, and 250 parts of toluene was slowly charged to the reaction vessel which had been flushed with an inert gas and heated to 120°–125° C. This operation required 1.6 hours. At 4.5 hours the temperature was allowed to fall, reaching 104° C. at 5 hours and being then held between 105° and 108° C. until the end of the eighth hour, when heating was discontinued. Additions of benzoyl peroxide were made according to the following schedule: at 3 hours, 10 parts; at 5 hours, 25 parts; at 6 hours, 10 parts; and at 7 hours, 4 parts. Addition of toluene was made as follows: at 3 hours, 90 parts; at 5 hours, 170 parts; at 6 hours, 85 parts; at 7 hours, 85 parts; and at 7.7 hours, 315 parts. The batch was cooled to yield a product which was a 32.5% solution of copolymer.

*Example 3*

There were mixed 407 parts of vinyl laurate, 93 parts of an acrylic ester, the alcohol group of which was derived from a 40:60 mixture of cetyl and stearyl alcohols, 10 parts of benzoyl peroxide, and 500 parts of toluene. This mixture was run during the course of 1.75 hours into a reaction which was maintained at 120° C. and was flushed with a current of nitrogen. At 4.25 hours, the temperature was dropped to 105° C. and maintained at 102°–105° C. until 7.75 hours. Additions of benzoyl peroxide were made as follows: at 2.75 hours, 4 parts; at 4.5 hours, 10 parts; at 5.5 hours, 4 parts; and at 6.5 hours, 1.5 parts. Toluene was added at the end of the heating period in an amount of 500 parts. The product was a 32.3% solution of copolymer in toluene. A 30% solution of copolymer in toluene had a viscosity of 26.3 centistokes at 100° F. This copolymer was transferred to a petroleum oil by mixing and heating under reduced pressure. In this way a concentrate in oil was prepared which could be mixed with wax-containing oils to lower the pour point thereof.

*Example 4*

There were mixed 65 parts of n-octadecyl acrylate, 180 parts of vinyl laurate, 12.5 parts of azodiisobutyronitrile, and 250 parts of toluene. This mixture was heated in a nitrogen atmosphere at 120° C. for 4.25 hours and then at 100°–105° C. until 7.75 hours had elapsed. Additions of azodiisobutyronitrile were made as follows: at 2.75 hours, 5 parts; at 4.75 hours, 12.5 parts; at 5.75 hours, 5 parts; and at 6.75 hours, 2 parts. The reaction mixture was diluted with 430 parts of toluene. The product was a 21% solution of copolymer in toluene.

*Example 5*

A mixture of 245 parts of vinyl isoheptoate, 255 parts of octadecyl acrylate, 25 parts of benzoyl peroxide, and 500 parts of toluene was stirred and heated under nitrogen. For 1.75 hours the temperature was kept between 113° and 108° C. From 6.25 hours to the end of the heating period at 7.5 hours it was kept at 105° C. Additions of benzoyl peroxide were made of 10, 25, 10, and 4 parts at 2.75, 4.5, 5.5, and 6.5 hours respectively. An addition of 175 parts of toluene was made at one hour and 485 part at 7.5 hours. The product was a 27% solution of copolymer, which in a 25% solution in toluene gave a viscosity of 36 centistokes at 100° F.

*Example 6*

A mixture of 306 parts of vinyl hexoate, 194 parts of cetyl acrylate, 25 parts of lauroyl peroxide, and 200 parts of toluene was slowly run into a reaction vessel heated at 110° C. under a nitrogen atmosphere. After the early additions had started to polymerize 175 parts of toluene was added to the reaction vessel and the rest of the mixture run in over the course of 1.5 hours. Additions of the peroxide were made at 2.75, 3.75, 5, and 6 hours in amounts of 10, 25, 10, and 4 parts respectively. During the first 4.5 hours the reaction temperature was kept between 106° and 110° C. and then until 7.8 hours at 105° C., when heating was discontinued. After the batch was diluted with 700 parts of toluene, the product was a 28.2% solution of copolymer. A sample adjusted to 25% of copolymer had a viscosity of 5.2 centistokes at 100° F.

Example 7

(a) A mixture of 27.7 parts of octadecyl acrylate, 72.3 parts of vinyl 2-ethylhexoate, 5 parts of benzoyl peroxide, and 25 parts of toluene was copolymerized by a procedure like that of Example 5. Additions of toluene totaled 130.5 parts and of peroxide 9.8 parts. The product was a 37.4% solution of copolymer in toluene. A 30% solution in toluene had a viscosity of 10.7 centistokes at 100° F.

(b) The above procedure was followed in general with substitution of tert.-butyl hydroperoxide for the benzoyl peroxide and use of one-fifth as much such catalyst, one part being used in the original mixture and 1.96 parts being added in small increments during the course of the copolymerization. The product was a 33% solution of copolymer in toluene. A 30% solution in toluene had a viscosity of 49 centistokes at 100° F.

Example 8

The procedure of Example 7 was followed with a mixture of 15 parts of octadecyl acrylate, 85 parts of vinyl isononoate, 2.5 parts of benzoyl peroxide, and 45 parts of toluene. Additions of peroxide during the course of copolymerization amounted to 5.1 parts and of toluene to 87 parts. The product was a 35% solution of copolymer in toluene. A 30% solution of copolymer in toluene had a viscosity of 23 centistokes at 100° F.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97-47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (oil I). This was an oil which proved to be relatively sensitive to the action of pour point depressants. A second oil (oil II) was a 500 mid-continent solvent-extracted neutral (S. A. E. 30) having a pour point of +25° F. This was known to be an oil which was not readily changed as to its pour point. The third oil (oil III) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F.

A copolymer was prepared from octadecyl acrylate and vinyl hexoate in a 1:2 mole ratio. In oil I at 0.5% it depressed the pour point to −10° F. A copolymer from the same esters but in a 1:1 mole ratio at 0.5% in oil I did not alter the pour point. A copolymer from octadecyl acrylate and vinyl hexoate in a 1:6 mole ratio was dissolved in oil I at 0.5% and 0.25%. These solutions had pour points of −10° F. A similar copolymer but in a 1:8 mole ratio also gave pour points of −10° F. at 0.5% and 0.25% in oil I, while a copolymer from the same esters in a 1:10 mole ratio gave a pour point of +5° F. at 0.5% but was not effective at 0.25% in this oil.

A series of copolymers was made from cetyl acrylate and vinyl hexoate over a range of mole ratios. The copolymers with 1:1 and 1:10 mole ratios had barely noticeable effects on the pour point of oil I. The copolymer from a 1:3 mole ratio of the two esters was quite effective. In oil I it gave a pour point of −25° F. at 0.5%, of −20° F. at 0.25%, of −10° F. at 0.1% and of 0° F. at 0.04%. The copolymer from a 1:6 mole ratio of the esters gave pour points as follows: −25° F. at 0.5%, −15° F. at 0.25%, −5° F. at 0.1%, and +5° F. at 0.04%.

Copolymers of stearyl acrylate and vinyl butyrate with mole ratios of 1:2 and 1:4 were made and examined. They did not have a practicable influence on the pour point of the test oils.

A copolymer was made from octadecyl acrylate and vinyl 2-ethylhexoate in a 1:3 mole ratio. At 0.5% in oil I it depressed the pour point to −25° F. A 1:1 copolymer from the same esters gave too small a depression of the pour point to be of value.

Copolymers were prepared from octadecyl acrylate and vinyl isoheptanoate in mole ratios of 1:2 and of 1:6. The former at 0.5% in oil I gave a pour point of 0° F. and at 0.25% of −5° F. The latter in oil I at 0.5% gave a pour point of −10° F.

A copolymer from stearyl acrylate and vinyl isononoate in a 1:2 mole ratio gave a pour point of −10° F. at 0.5% in oil I. A copolymer from these esters but in a 1:8 mole ratio gave a pour point of −10° F. at 0.5% in the same oil.

A copolymer from octadecyl acrylate and vinyl laurate in a 1:1 mole ratio gave but a small depression of pour point at 0.5%. A copolymer from these esters in 1:6 mole ratio gave the following results in oil I: −25° F. at 0.5%, −20° F. at 0.25%, −20° F. at 0.1%, and +5° F. at 0.04%. The pour point of oil III was depressed to 0° F. with 0.1% of this copolymer. A solution of 0.5% in oil II gave a pour point of −15° F. by shock chilling.

A copolymer from stearyl acrylate and vinyl laurate in a 1:24 mole ratio gave the following pour points: in oil I at 0.5%, −30° F.; at 0.25%, −25° F.; at 0.1%, −15° F.; and at 0.04%, 0° F.; in oil II at 0.5%, −10° F., by the maximum pour method; and in oil III at 0.1%, 0° F. It should be commented that in the case of the copolymers based on vinyl laurate the upper limit of this ester is much more flexible than with other vinyl esters copolymerized with stearyl or cetyl acrylate. Vinyl laurate by itself is of no value as a pour depressant. Yet when a relatively small amount of a long chained acrylate is copolymerized therewith, the resulting copolymers have a profound influence on the pour points of waxy oils. Even though the upper limits for the proportions of vinyl esters are not sharp, the practical limits are defined by the ratios of 1:2 to 1:3$n$—10.

Polymers of cetyl acrylate and octadecyl acrylate and mixtures thereof have been examined in the test oils. These polymers do not depress their pour points. Mechanical mixtures were made of octadecyl polyacrylate and polyvinyl laurate. These mixtures, in mole ratios of 1:4 and 1:10, failed to lower the pour point.

A copolymer was made from decyl acrylate and vinyl laurate in a 1:2 mole ratio. A solution of this copolymer in oil I at 0.5% gave a pour point of +30° F.

A copolymer of cetyl acrylate and vinyl decanoate in a 1:10 mole ratio depressed the pour point of oil I to −20° F. when dissolved therein at 0.5%.

A copolymer was prepared from octadecyl thioacrylate and vinyl laurate in a 1:4 mole ratio. It gave the following pour points in oil I: at 0.5%, −35° F.; at 0.25%, −30° F.; at 0.1%, −25° F.; and at 0.04%, −10° F.

A copolymer from octadecyl acrylate and vinyl 3,5,5-trimethylhexoate was prepared in a 1:8 mole ratio. At 0.5% in oil I it gave a pour point of −15° F.; at 0.5% in oil II a pour point of −15° F. by the maximum pour test; at 0.1% in oil III a pour point of −5° F. by shock chilling. Other effective copolymers from this pair of esters are obtained with variations of 1:6, 1:4, and 1:2 in the mole ratios.

A copolymer which was prepared by methods illustrated above from stearyl acrylate and vinyl isoheptanoate in a mole ratio of 1:2 and which gave to a 30% solution of the copolymer in toluene a viscosity of 36 centistokes at 100° F. was dissolved in an oil which was characterized by the following data: viscosities at 210° F. of 5.25 centistokes, and at 100° F. of 45.1 centistokes and viscosity index of 16. A 3.2% solution of the copolymer in this had viscosities of 7.57 centistokes at 210° F. and 63.5 centistokes at 100° F. with a viscosity index of 87. At 2% of copolymer the solution had viscosities of 6.80 centistokes at 210° F. and 57.8 centistokes at 100° F. with a viscosity index of 72. At 0.8% of copolymer the solution had viscosities of 5.84 centistokes at 210° F. and 49.7 centistokes at 100° F. with a viscosity index of 47.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and Diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of (A) an ester of acrylic acid and a saturated monohydric aliphatic alcohol, ROH, in which R is an alkayl chain of 16 to 18 carbon atoms, and (B) a vinyl ether of a saturated aliphatic monocarboxylic acid of 6 to 12 carbon atoms, the proportion of the acrylic ester (A) groups to the vinyl ester (B) groups being from 1:2 moles to 1:(3$n$—10), where $n$ is the number of carbon atoms in the longest chain of the vinyl ester.

2. A copolymer of cetyl acrylate and vinyl laurate, the ratio of acrylate groups to vinyl groups being from 1:2 to 1:26.

3. A copolymer of octadecyl acrylate and vinyl laurate, the ratio of acrylate groups to vinyl groups being from 1:2 to 1:26.

4. A copolymer of octadecyl acrylate and vinyl hexoate, the ratio of acrylate groups to vinyl groups being from 1:2 to 1:8.

5. A copolymer of octadecyl acrylate and vinyl 2-ethylhexoate, the ratio of acrylate groups to vinyl groups being from 1:2 to 1:8.

6. A copolymer of octadecyl acrylate and vinyl 3,5,5-trimethylhexoate, the ratio of acrylate groups to vinyl groups being from 1:2 to 1:8.

WILLIAM L. VAN HORNE.
HARRY T. NEHER.
LA VERNE N. BAUER.

REFERENCES CITED

The following references are of record in the file of this patent:

UNITED STATES PATENTS

| Number | Name | Date |
|---|---|---|
| 2,020,714 | Wulff et al. | Nov. 12, 1935 |
| 2,117,321 | Hill | May 17, 1938 |